United States Patent [19]

Goto

[11] Patent Number: 5,416,877
[45] Date of Patent: May 16, 1995

[54] OPTICAL WAVELENGTH CONVERTER DEVICE AND OPTICAL WAVELENGTH CONVERTER MODULE

[75] Inventor: Chiaki Goto, Kanagawa, Japan

[73] Assignee: Fuji Photo Film Co., Ltd., Kanagawa, Japan

[21] Appl. No.: 384,532

[22] Filed: Jul. 25, 1989

[30] Foreign Application Priority Data

Jul. 26, 1988 [JP] Japan ................. 63-186080
Jul. 26, 1988 [JP] Japan ................. 63-186081

[51] Int. Cl.⁶ ................................................ G02F 1/37
[52] U.S. Cl. .............................. 385/122; 359/328; 359/332
[58] Field of Search ............. 350/96.15, 96.16, 96.18, 350/96.19, 96.29, 286, 287, 421, 432, 447, 3.7, 3.71, 3.72; 307/425, 430; 359/328, 332; 372/21, 22; 385/122

[56] References Cited

U.S. PATENT DOCUMENTS

| | | | |
|---|---|---|---|
| 4,081,207 | 3/1978 | Dippel | 350/286 X |
| 4,215,274 | 7/1980 | Segall | 250/361 R |
| 4,255,021 | 3/1981 | Brunsden | 350/286 |
| 4,421,379 | 12/1983 | Grumet et al. | 350/3.72 |
| 4,671,609 | 6/1987 | Khoe et al. | 350/96.18 |
| 4,688,880 | 8/1987 | Tatsuno et al. | 350/3.72 |
| 4,721,378 | 1/1988 | Volk | 350/432 X |
| 4,730,883 | 3/1988 | Mori | 350/287 X |
| 4,767,169 | 8/1988 | Teng et al. | 307/430 X |
| 4,768,867 | 9/1988 | Suda | 350/432 |
| 4,772,105 | 9/1988 | Takada | 350/432 X |
| 4,780,877 | 10/1988 | Snitzer | 350/96.29 |
| 4,826,299 | 5/1989 | Powell | 350/432 |
| 4,830,447 | 5/1989 | Kamiyama et al. | 307/425 X |
| 4,838,638 | 6/1989 | Kamiyama et al. | 350/96.19 |
| 4,843,494 | 6/1989 | Cronin et al. | 350/3.75 X |
| 4,874,221 | 10/1989 | Ohsawa | 350/96.29 |
| 4,892,375 | 1/1990 | Chikuma et al. | 350/96.18 |
| 4,909,587 | 3/1990 | Okamoto et al. | 350/96.19 |
| 4,972,422 | 11/1990 | Tatsuno | 372/22 |
| 5,046,817 | 9/1991 | Uenishi et al. | 359/328 |

FOREIGN PATENT DOCUMENTS

0342523 11/1989 European Pat. Off. .
63-15235 1/1988 Japan .

OTHER PUBLICATIONS

*Introduction to Optical Electronics*, Amnon Yariv, 1974, pp. 199–205, (Japanese–no translation).
*Microoptics News*, Japan Society of Applied Physics, Optics Division Group of Micro-Optics, vol. 3, No. 2, Apr. 25, 1985, pp. 114–118, (Japanese-No translation).
*Laser Foucs*, vol. 22, No. 11, Nov. 1986, "Waveguide Converts Diode-Laser Beam to Visible", p. 20.

*Primary Examiner*—John D. Lee
*Attorney, Agent, or Firm*—Sughrue, Mion, Zinn, Macpeak & Seas

[57] ABSTRACT

Fiber Cherenkov type optical wavelength converter device includes a cladding having an exit end for emitting a wavelength-converted wave. The exit end of the cladding is either of a conical shape, or supports a grating composed of concentric patterns which convert the conical wavefront of the wavelength-converted wave into a plane or spherical wavefront. Alternatively, the optical wavelength converter module comprises a fiber Cherenkov type optical converter device and an optical device, such as a lens or grating device, which convert the conical wavefront of the wavelength-converted wave into a plane or spherical wavefront.

28 Claims, 9 Drawing Sheets

F I G. 9
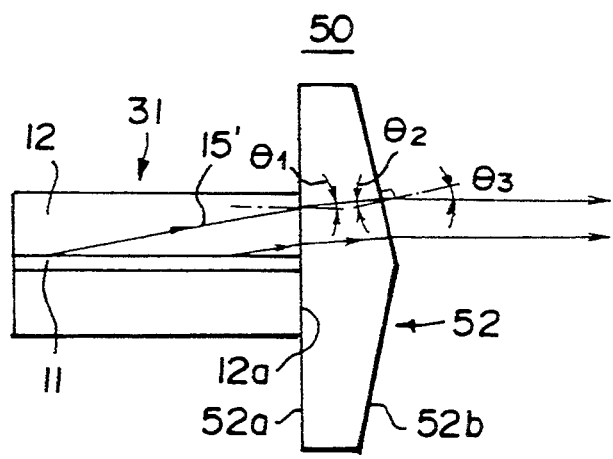
F I G. 10
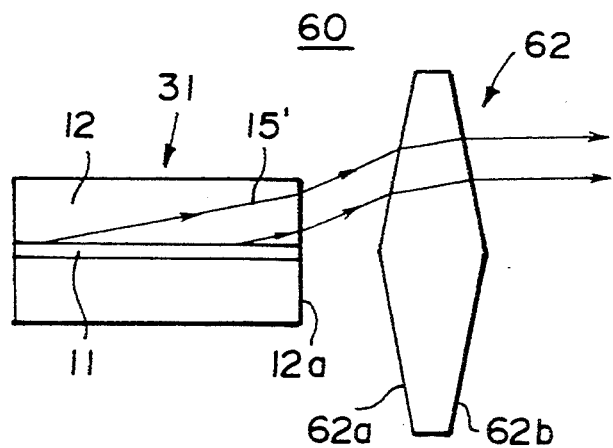
F I G. 11
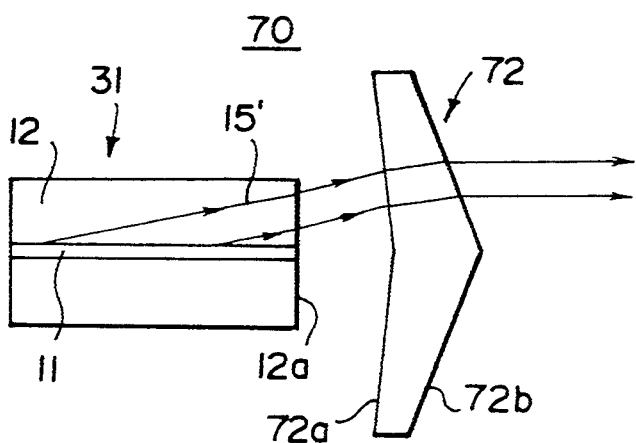

F I G. 22
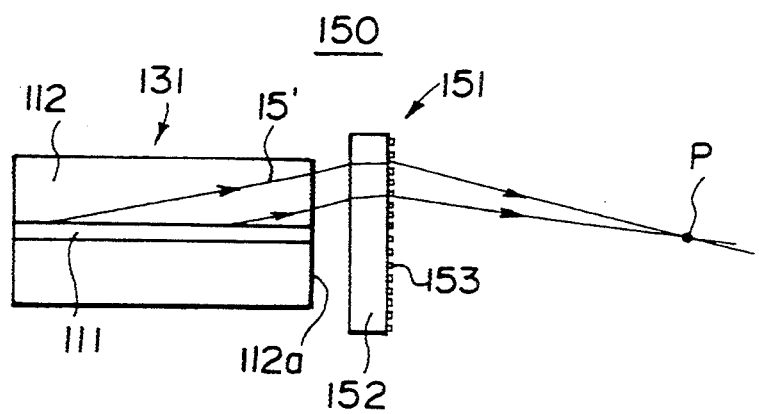
F I G. 23
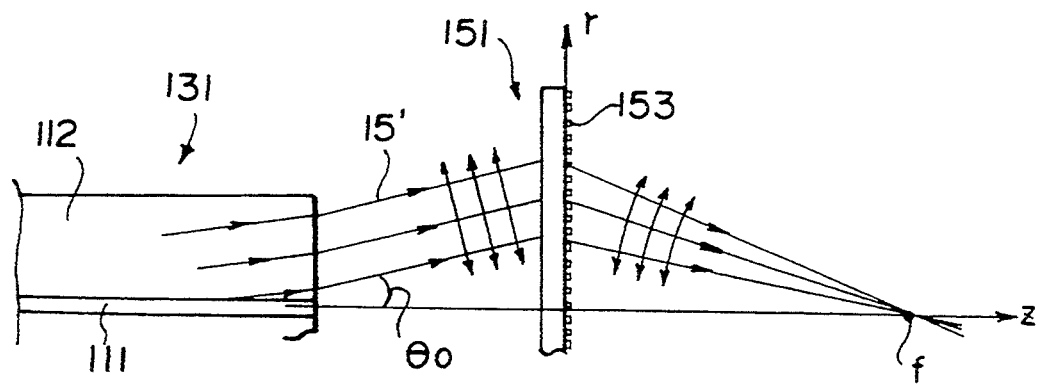

OPTICAL WAVELENGTH CONVERTER DEVICE AND OPTICAL WAVELENGTH CONVERTER MODULE

BACKGROUND OF THE INVENTION

1. Field of the Invention

The present invention relates; to an optical wavelength converter device, which converts a fundamental wave into a second harmonic, having a wavelength which is ½ of that of the fundamental wave; to a fiber-type optical wavelength converter device which converts a fundamental wave into a third harmonic; to a fiber-type optical wavelength converter device which converts fundamental waves having two different wavelengths into a wave having a frequency equal to the sum of or the difference between the fundamental waves; and to an optical wavelength converter module which employs such an optical wavelength converter device. More particularly, it relates to an optical wavelength converter device and an optical wavelength converter module, both of which can convert the conical wavefront of a wavelength-converted wave into a plane or spherical wavefront.

2. Description of the Prior Art

Various attempts have heretofore been made to convert the wavelength of a laser beam into a second harmonic, i.e., shortening the wavelength of a laser beam, using nonlinear optical material. One well known example of such an optical wavelength converter device for effecting such laser wavelength conversion is the bulk crystal type converter device as disclosed in *Introduction to Optical Electronics*, pages 200–204, written by A. Yariv and translated by Kunio Tada and Takeshi Kamiya (published by Maruzen K. K.). This optical wavelength converter device relies upon the birefringence of a crystal in order to meet phase matching conditions. Therefore, material which does not exhibit birefringence, or exhibits only small birefringence, even if it has high nonlinearity cannot be employed.

To solve the above problem, a fiber type optical wavelength converter device is proposed. The optical wavelength converter device of this type is in the form of an optical fiber comprising a core made of nonlinear optical material and surrounded by a cladding. One example of such an optical fiber is shown in the vol. 3, No. 2, pages 28–32, Bulletin of the Microoptics Research Group of a Gathering of the Applied Physics Society. Recently, many efforts are directed to the study of the fiber type optical wavelength converter device since it can easily gain phase matching between a guided mode in which a fundamental is guided through the core and a radiated mode in which a second harmonic is radiated into the cladding (the so-called Cherenkov radiation).

The wavelength-converted wave produced by any of the above optical wavelength converter devices is emitted from the output end of the cladding and has various applications. In many of the applications, the wavelength-converted wave is converged into a small spot. For example, the wavelength-converted wave is focused into a very small spot for higher recording density when a wavelength-converted wave is used optically to record information signals.

However, it is recognized that the wavelength-converted wave emitted from the fiber Cherenkov type optical wavelength converter device cannot converge into a small spot even if the emitted wave is passed through a general spherical lens.

SUMMARY OF THE INVENTION

It is an object of the present invention to provide an optical wavelength converter device, capable of converging a wavelength-converted wave into a small spot, and an optical wavelength converter module, which employs such an optical wavelength converter device.

The principles of the present invention are based on the finding that a wavelength-converted wave (which is emitted at a certain phase matching angle and in phase with a fundamental wave) radiated into the cladding of a fiber Cherenkov type optical wavelength converter device has a conical wavefront.

According to the present invention, an optical wavelength converter device comprises a fiber Cherenkov type optical wavelength converter device which includes a cladding having an exit end for emitting a wavelength-converted wave, the exit end of the cladding being conical so that it converts the conical wavefront of the wavelength-converted wave into a plane wavefront.

As will be described later on, the slanted surface of the conical exit end of the cladding must have a certain angle selected on the phase matching angle in order to convert the conical wavefront into a plane wavefront. Japanese Unexamined Patent Publication No. 63(1988)-15235 discloses a fiber type optical wavelength converter device which has a cladding that is progressively tapered toward its exit end. However, the wavelength-converted wave is not emitted from the tapered portion of the cladding, but from a small inner cladding end perpendicular to the axis of the fiber. Since the angle of the tapered surface of the cladding is not selected on the phase matching angle, the disclosed fiber type optical wavelength converter device is different from the optical wavelength converter device according to the present invention.

Another optical wavelength converter device according to the present invention comprises a fiber Cherenkov type optical wavelength converter device which includes a cladding with an exit end for emitting a wavelength-converted wave. The exit end has a grating composed of equally spaced concentric patterns which convert the conical wavefront of the wavelength-converted wave into a plane wavefront.

Also, according to the present invention, there is an optical wavelength converter module comprising an optical wavelength converter device, of the type described above, and an optical device disposed in a position to receive a wavelength-converted wave emitted from the exit end of the cladding of the optical wavelength converter device, which converts the conical wavefront of the received wavelength-converted wave into a plane wavefront.

The optical device may for example be a lens either having a conical entrance surface and/or a conical exit surface, a graded-index lens which is functionally equivalent to the above lens, or a grating having equally spaced concentric patterns. The optical device may be spaced from, or held intimately against, the exit end of the cladding.

If the conical wavefront of the wavelength-converted wave is converted into a plane wavefront by the optical lens, the conical exit end of the cladding, or the grating of equally spaced concentric patterns on the exit end of the cladding, then the wavelength-converted wave can converge into a small spot when passed through an ordinary spherical lens.

According to the present invention, still another optical wavelength converter device comprises a fiber Cherenkov type optical wavelength converter device which includes a cladding having an exit end for emitting a wavelength-converted wave, and the exit end of the cladding having an aspherical lens surface for converting the conical wavefront of the wavelength-converted wave into a spherical wavefront.

Yet another optical wavelength converter device according to the present invention comprises also a fiber Cherenkov type optical wavelength converter device including a cladding which has an exit end for emitting a wavelength-converted wave, the exit end having a grating composed of concentric patterns for converting the conical wavefront of the wavelength-converted wave into a spherical wavefront.

The present invention further provides an optical wavelength converter module comprising an optical wavelength converter device of the type described above and an optical device disposed in a position to receive the wavelength-converted wave emitted from the exit end of the cladding of the optical wavelength converter; this converts the conical wavefront of the received wavelength-converted wave into a spherical wavefront.

The optical device may for example be a lens having entrance and exit surfaces thereof, being conical and spherical or a grating having concentric patterns which functions equivalently to the above lens. The optical device may be spaced from, or held intimately against, the exit end of the cladding.

If the conical wavefront of the wavelength-converted wave is converted into a convergent spherical wavefront by the optical lens, the aspherical lens surface of the exit end of the cladding, or the grating of concentric patterns on the exit end of the cladding, then the wavelength-converted wave can be converged into a small spot. Even if the conical wavefront of the wavelength-converted wave has been converted into a divergent spherical wavefront, the wavelength-converted wave can be converged into a small spot by passing it through an ordinary spherical lens.

The above object and other objects, as well as the features and advantages of the present invention will become more apparent in the following description taken in conjunction with the accompanying figures in which the preferred embodiments of the present invention are shown.

BRIEF DESCRIPTION OF THE DRAWINGS

FIGS. 7, 8, 9, 10, 11, 12, 13 and 14 are sectional side elevational views of optical wavelength converter modules according to the respective third, fourth, fifth, sixth, seventh eighth, ninth and tenth embodiments of the present invention, FIGS. 20, 21 and 22 are sectional side elevational views of optical wavelength converter modules according to the thirteenth, fourteenth, and fifteenth embodiments, respectively, of the present invention, FIG. 23 is a fragmentary sectional side elevational view illustrating the configuration of a grating of concentric patterns in the optical wavelength converter module shown in FIG. 22.

DESCRIPTION OF THE PREFERRED EMBODIMENTS

Figure 1:
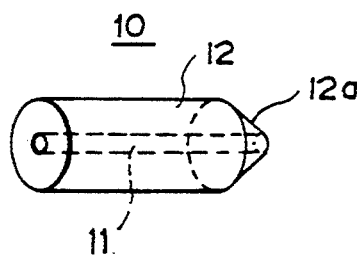
FIG. 1 is a schematic perspective view of an optical wavelength converter device according to the first embodiment of the present invention.

Identical parts are denoted by identical reference numerals throughout the figures.

Figure 2:
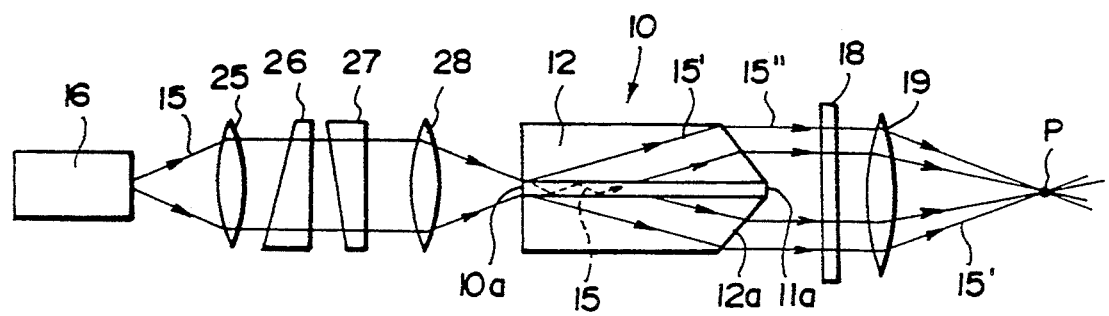
FIG. 2 is a side elevational view showing the manner in which the optical wavelength converter shown in FIG. 1 is used.

FIGS. 1 and 2 show an optical wavelength converter device 10 according to the first embodiment of the present invention. The optical wavelength converter device 10 comprises an optical fiber including a core 11, which is made of a nonlinear optical material and filled into the hollow space defined centrally in the cladding 12. The nonlinear optical material of the core 11 is preferably an organic nonlinear optical material having a high wavelength conversion efficiency. In this embodiment, the core 11 is made of 3,5-dimethyl-1-(4-nitrophenyl)pyrazole (hereinafter referred to as "PRA").

Figure 3:
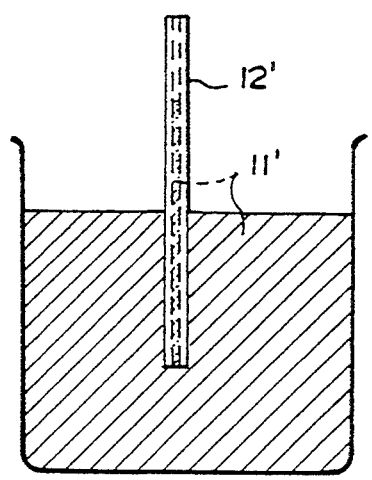
FIG. 3 is a schematic view showing a process of manufacturing the optical wavelength converter device shown in FIG. 1.

The process of manufacturing the optical wavelength converter device 10 will be described below with reference to FIG. 3. It is assumed that the core 11 is made of PRA and the cladding 12 is made of SFS3 glass. A hollow glass fiber 12' which will serve as the cladding 12 is provided, the hollow glass fiber 12' having an outside diameter of about 3 mm and the hollow space therein having a diameter of about 2 $\mu$m, for example. As shown in FIG. 3, PRA is kept as a molten solution 11' in a furnace, and one end of the glass fiber 12' is immersed in the molten solution 11'. The molten solution 11' of PRA then enters the hollow space in the glass fiber 12' due to capillarity. The molten solution 11' is kept at a temperature slightly higher than the melting point of PRA (102° C.) in order to prevent the PRA from being decomposed. Thereafter, the glass fiber 12' is quickly cooled, causing the PRA in the hollow space to be polycrystallized.

Then, the glass fiber 12' is gradually pulled from the furnace, which is kept at a temperature higher than the melting point of PRA (e.g. 102.5° C.), into the outer space, which is kept at a temperature lower than that melting point, thereby causing the molten PRA to be monocrystallized continuously at the point where it is withdrawn from the furnace. The core 11 thus prepared is of highly long monocrystalline form with a uniform crystal orientation. The optical wavelength converter device 10 is thereby made sufficiently long.

After the core 11 is filled in the glass fiber 12', the opposite ends of the glass fiber 12' are cut off at suitable points. One end 10a (FIG. 2) of the glass fiber, which is to serve as an entrance for receiving the light beam, is cut perpendicularly to the axis of the glass fiber. The other cladding end 12a of the glass fiber is finished to a conical shape by a known grinding process. In this manner, the optical wavelength converter device 10, shown in FIGS. 1 and 2, is produced. The configuration of the cladding end 12a will be described later on.

The optical wavelength converter device 10 is used as shown in FIG. 2. A semiconductor laser 16, capable of emitting a laser beam 15 (having a wavelength of 870 nm, for example), is employed as the fundamental wave generating means. The laser beam (fundamental wave) 15 emitted as a divergent beam from the semiconductor laser 16 is converted by a collimator lens 25 to a parallel beam whose cross section is then shaped into a circular shape by beam shaper prisms 26, 27. The laser beam 15 is then converged by an objective lens 28 and applied to the entrance end 10a (the end of the core 11) of the optical wavelength converter device 10. The laser beam 15 now enters the core 11. The laser beam or fundamental wave 15 is then converted by the PRA of the core 11 into a second harmonic 15' whose wavelength is ½ of the wavelength of the fundamental wave 15. The second harmonic 15' is radiated into the cladding 12 and travels through the device 10 toward the opposite exit end thereof. Phase matching is achieved between a guided mode, in which the fundamental wave 15 is guided through the core 11, and a radiated mode, in which the second harmonic 15' is radiated into the cladding 12 (Cherenkov radiation).

The second harmonic 15' is emitted out of the device 10 from the end 12a of the cladding 12. The fundamental wave 15, which has been guided through the core 11, is emitted from the end 11a of the core 11. A light beam 15", containing the second harmonic 15', and the fundamental wave 15 then goes through a filter 18 which passes only the second harmonic 15'. Therefore, only the second harmonic 15' is extracted by the filter 18. The second harmonic 15' then passes through a condenser lens 19 in the form of a general spherical lens by which it is converged into a small beam spot P. FIG. 2 does not show any device which utilizes the second harmonic 15'. However, typical devices used in conjunction with the second harmonic usually utilizes the focused spot of the second harmonic 15'.

Figure 4:
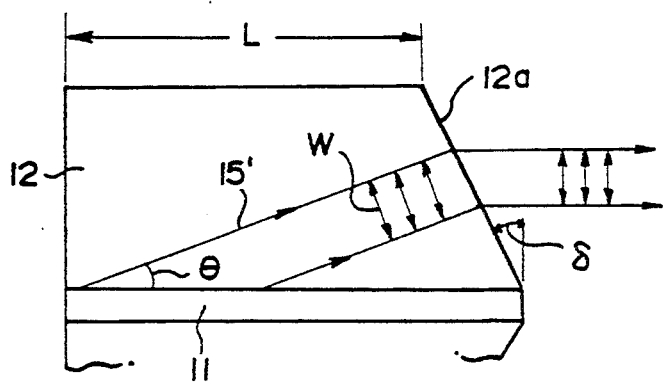
FIG. 4 is an enlarged fragmentary sectional side elevational view of the optical wavelength converter device shown in FIG. 1.

Operation of the conically shaped end 12a of the cladding 12 will hereinafter be described in detail. In this embodiment, as shown in FIG. 4, the cladding 12 is thick enough for the second harmonic 15' radiated into the cladding 12 at a phase matching angle $\theta$ to be emitted out of the device 10 directly from the cladding end 12a without being totally reflected by the outer surface of the cladding 12. To achieve this, the diameter D of the cladding 12 should be selected to meet the condition:

$$D > 2L \cdot \tan\theta + d \quad (1)$$

where d is the diameter of the core 11 and L is the length of the outer peripheral surface of the cladding 12. With such dimensional limitations, the wavefront of the second harmonic 15' traveling through the cladding 12 is oriented as indicated by the arrows W in FIG. 4 in one plane including the core axis. Therefore, the wavefront is of a conical shape as a whole. It is now assumed that the refractive index of the cladding 12 is indicated by $n_C$, the refractive index of a medium (usually air) around the device 10 by $n_A$, the angle of incidence of the second harmonic 15' to the cladding end 12a by $\alpha$, and the angle at which the cladding end 12a is inclined to a plane normal to the core axis by $\delta$. Then, if the following equation is satisfied:

$$n_C \sin \alpha = n_A \sin \delta$$

the wavefront of the second harmonic 15' emitted out of the cladding 12 will become a plane wavefront. By putting $\alpha = \delta - \theta$ into the above equation and solving the equation for $\delta$, we get:

$$\delta = \tan^{-1}\left(\frac{n_C \sin\theta}{n_C \cos\theta - n_A}\right)$$

since the angle $\delta$ at which the cladding end 12a is cut is selected to be of the value defined above, the second harmonic 15' emitted out of the optical wavelength converter device 10 has a plane wavefront. Consequently, it is possible to converge the second harmonic 15' into a small beam spot P by passing the second harmonic 15' through the condenser lens 19.

Figure 5:
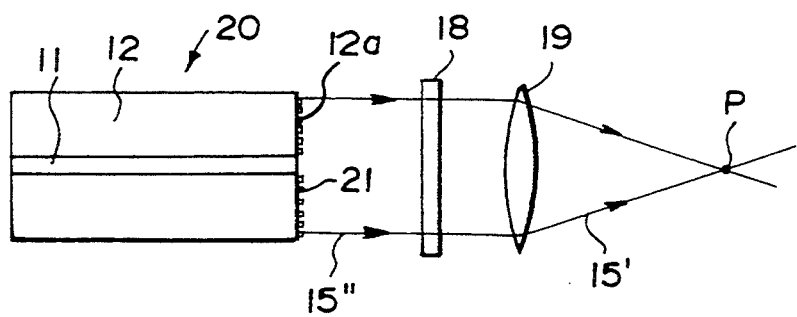
FIG. 5 is a sectional side elevational view and FIG. 6 is a front elevational view of an optical wavelength converter device according to the second embodiment of the present invention.
Figure 6:
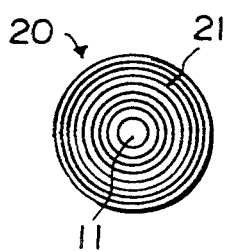

An optical wavelength converter device according to the embodiment of the present invention will be described below with reference to FIGS. 5 and 6. The optical wavelength converter device, denoted at 20, has a cladding end 12a for emitting a second harmonic 15' the cladding end 12a having a surface extending perpendicularly to the core axis. A grating 21 composed of equally spaced concentric patterns is disposed on the surface of the cladding end 12a. The grating 21 may be formed by the photolithographic process. According to this embodiment, the diameter D of the cladding 12 is thick, ranging from 1 mm to 3 mm, for example, so that condition (1) given above can be satisfied. Then, the grating 21 can be formed on the cladding end 12a relatively easily. The grating 21 has a pitch $\Lambda$ (a radial increment) by which the concentric patterns thereof are radially spaced and is selected as follows:

$$\Lambda = \frac{\lambda}{n_C \sin\theta}$$

By having the second harmonic 15' pass through the grating 21, the conical wavefront of the second harmonic 15' can be converted into a plane wavefront. Thus, the second harmonic 15' can be focused into a small beam spot P by the condenser lens 19.

Figure 7:
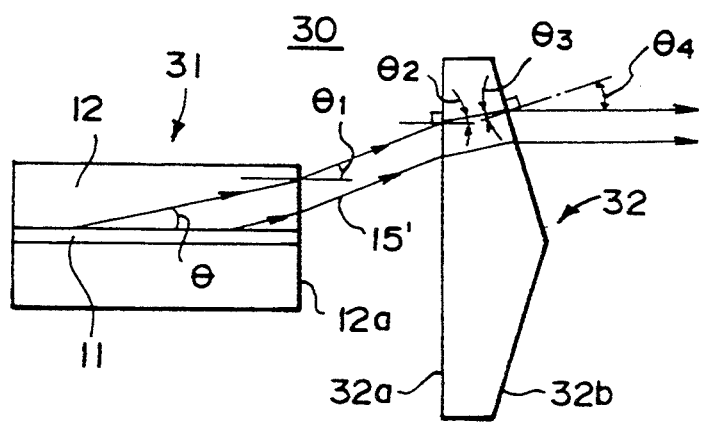

FIG. 7 shows an optical wavelength converter module 30 according to the third embodiment of the present invention. The optical wavelength converter module 30 comprises a fiber Cherenkov type optical wavelength converter device 31, which is similar to the device 20 shown in FIG. 5, and a lens 32, which is disposed in confronting relation to the end (exit end) 12a of the cladding 12 of the optical wavelength converter device 31. The lens 32 has a plane surface 32a facing the optical wavelength converter device 31 and a conical surface 32b remote from the device 31. If it is assumed that the refractive index of the cladding 12 is indicated by $n_C$, the refractive index of a medium (usually air) around the device 31 by $n_A$, and the refractive index of the material of the lens 32 by $n_L$, then the following equations are met:

$$n_C \sin \theta = n_A \sin \theta_1$$

$$n_A \sin \theta_1 = n_L \sin \theta_2$$

$$n_L \sin \theta_3 = n_A \sin \theta_4$$

$$\theta_3 = \rho - \theta_2$$

where $\rho$ is the angle at which the lens surface 32b is inclined. If the second harmonic 15' that has passed through the lens 32 is a parallel beam, then the angle $\rho$ is $\rho = \theta_4$. From the above three equations, we get:

$$n_C \sin \theta = n_L \sin (\rho - \theta_3)$$

$$n_L \sin \theta_3 = n_A \sin \rho$$

Consequently, by selecting the angle $\rho$ of inclination of the conical lens surface 32b so as to meet the above two equations, the second harmonic 15' that has passed through the lens 32 has a plane wavefront. According to the third embodiment, therefore, the second harmonic 15' can be converged into a small beam spot in the same manner as the first and second embodiments.

Figure 8:
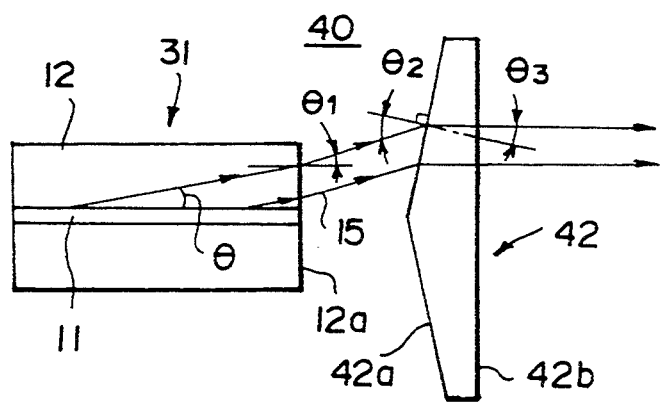

An optical wavelength converter module 40 according to the fourth embodiment shown in FIG. 8 also comprises an optical wavelength converter device 31 and a lens 42. The lens 42 has a conical surface 42a facing the optical wavelength converter device 31 and a plane surface 42b remote from the device 31. According to the fourth embodiment, the following equations are satisfied:

$$n_C \sin \theta = n_A \sin \theta_1$$

$$n_A \sin \theta_2 = n_L \sin \theta_3$$

$$\theta_2 = \theta_1 + \rho$$

where $\rho$ is the angle at which the lens surface 42a is inclined. If the second harmonic 15' that has passed through the lens 32 is a parallel beam, then the angle $\rho$ is $\rho = \theta_3$. From the above three equations, we get:

$$n_C \sin \theta = n_L \sin \theta_1$$

$$n_L \sin (\theta + \rho) = n_L \sin \rho$$

By selecting the angle $\rho$ of inclination of the conical lens surface 42a so as to meet the above two equations, the second harmonic 15' that has passed through the lens 42 has a plane wavefront.

An optical wavelength converter module according to the fifth embodiment of the present invention will be described with reference to FIG. 9. The optical wavelength converter module, denoted at 50, also comprises an optical wavelength converter device 31 and a lens 52. The lens 52 has a flat surface 52a which faces the optical wavelength converter device 31, and a conical surface 52b, which is remote from the device 31. The flat surface 52a is held intimately against the cladding end 12a of the optical wavelength converter device 31. According to the fifth embodiment, the following equations are satisfied:

$$n_C \sin \theta = n_L \sin \theta_1$$

$$n_L \sin \theta_2 = n_A \sin \theta_3$$

$$\theta_2 = \rho - \theta_1$$

where $\rho$ is the angle at which the lens surface 52b is inclined. If the second harmonic 15' that has passed through the lens 52 is a parallel beam, then the angle $\rho$ is $\rho = \theta_3$. From the above three equations, we get:

$$n_C \sin \theta = n_L \sin \theta_1$$

$$n_L \sin (\rho - \theta_1) = n_A \sin \rho$$

By selecting the angle $\rho$ of inclination of the conical lens surface 52b so as to meet the above two equations, the second harmonic 15' that has passed through the lens 52 has a plane wavefront.

In the third, fourth and fifth embodiments, the lenses 32, 42, 52 have one plane surface and one conical surface. According to the sixth embodiment shown in FIG. 10, an optical wavelength converter module 60 includes a lens 62 having two opposite conical surfaces 62a, 62b for converting the conical wavefront of the second harmonic 15' into a plane wavefront. An optical wavelength converter module 70 according to the seventh embodiment illustrated in FIG. 11 has a lens 72 having a concave conical surface 72a and an opposite convex conical surface 72b, the convex conical surface 72b being inclined at a greater angle than the Concave conical surface 72a.

Figure 12:
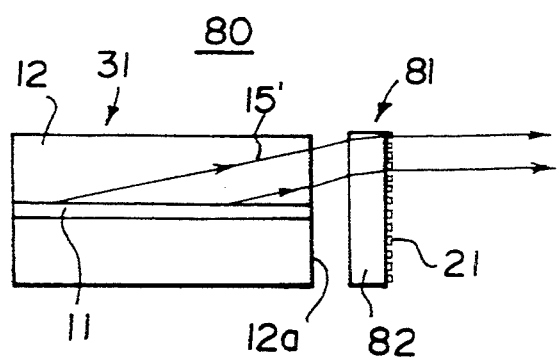

An optical wavelength converter module 80 according to the eighth embodiment of the present invention will hereinafter be described with reference to FIG. 12. The optical wavelength converter device 80 comprises a fiber Cherenkov type optical wavelength converter device 31, and a grating device 81, which is disposed in confronting relation to the exit end 12a of the cladding of the device 31. The grating device 81 comprises a grating 21 composed of equally spaced concentric patterns, which is identical to the grating according to the second embodiment shown in FIGS. 5 and 6, and the grating 21 being disposed on one surface of a transparent member 82 which is remote from the optical wavelength converter device 31. The wavefront of the second harmonic 15' emitted from the cladding end 12a can be converted into a plane wavefront by passing through the grating device 81.

Figure 13:
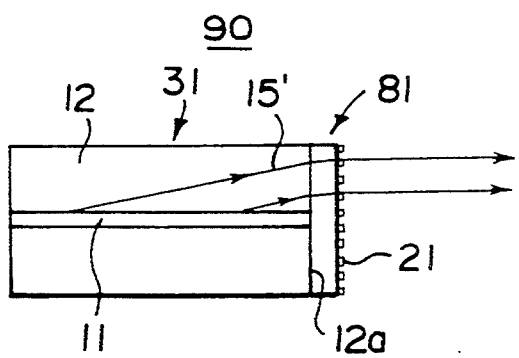

While the grating device 81 is spaced from the optical wavelength converter device 31 in the eighth embodiment, the grating device 81 may be held in intimate contact with the cladding end 12a of the device 31 in an optical wavelength converter module 90 according to the ninth embodiment illustrated in FIG. 13.

Figure 14:
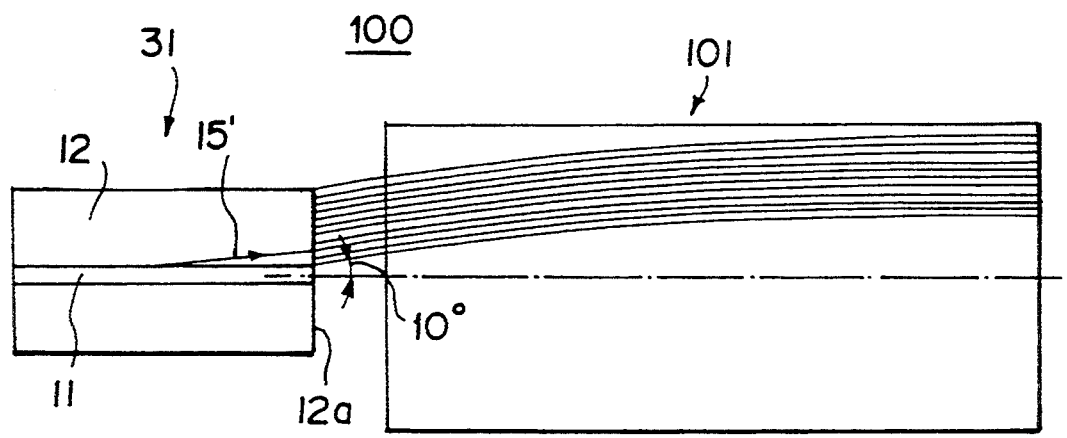

An optical wavelength converter module 100 according to the tenth embodiment of the present invention will hereinafter be described with reference to FIG. 14. The optical wavelength converter device 100 comprises a fiber Cherenkov type optical wavelength converter device 31, and a graded-index lens 101, which is disposed in confronting relation to the exit end 12a of the cladding 12 of the device 31. The medium around the optical wavelength converter device 31 is air whose refractive index is $n_A=1.0$, and satisfies the following equation:

$$n_C \sin \theta = \sin 10°$$

The wavefront of the second harmonic 15' can be converted into a plane wavefront if the graded-index lens 101 has a length of 8.66 mm and a refractive index distribution $n(r) = 1.5 - 0.02r$; this means that the refractive index of the lens material is lowered 0.02 per 1 mm in a radially inward direction and the refractive index at the center of the lens is 1.5.

The graded-index lens 101 may be positioned in close contact with the cladding end 12a.

Figure 15:
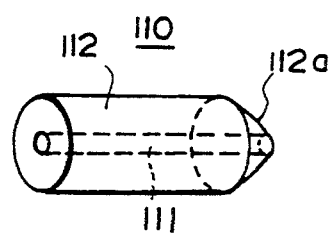
FIG. 15 is a schematic perspective view of an optical wavelength converter device according to the eleventh embodiment of the present invention.
Figure 16:
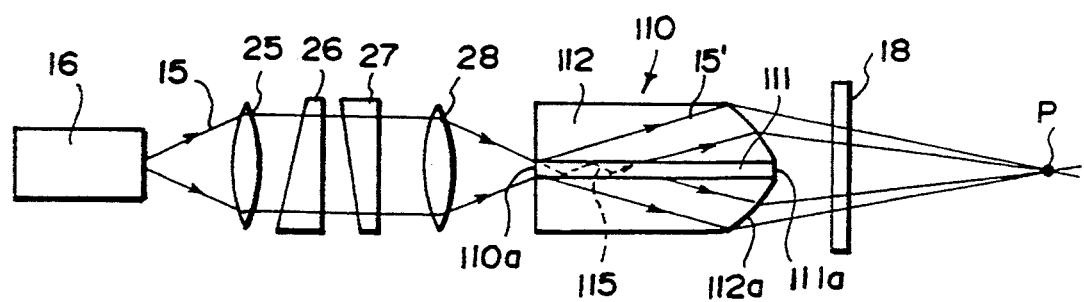
FIG. 16 is a side elevational view showing the manner in which the optical wavelength converter shown in FIG. 15 is used.
Figure 17:
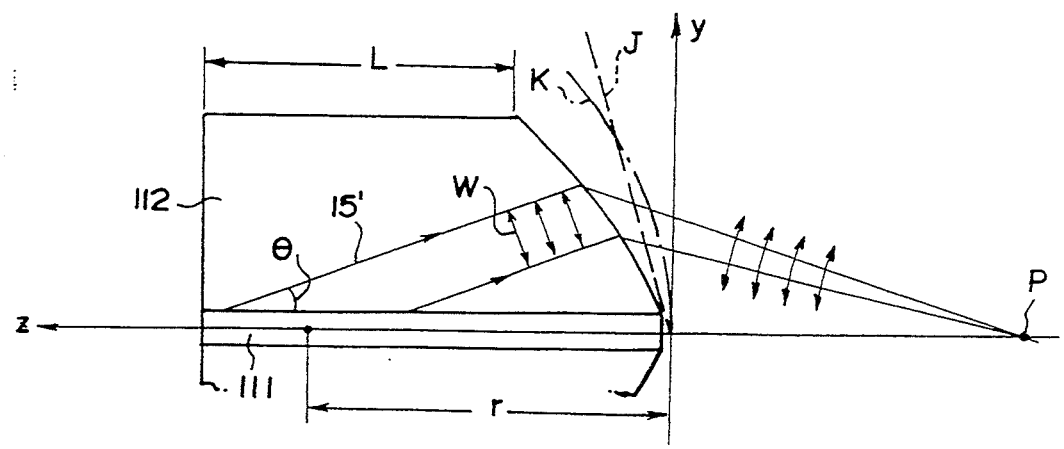
FIG. 17 is an enlarged fragmentary sectional side elevational view of the optical wavelength converter device shown in FIG. 15.

FIGS. 15, 16 and 17 illustrate an optical wavelength converter device 110 according to the eleventh embodiment of the present invention. The optical wavelength converter device 110 is fabricated in the same manner as the optical wavelength converter device 10 according to the first embodiment shown in FIGS. 1 through 4. The end of the optical wavelength converter device 110, which will serve as an entrance end 110a for receiving light beams, is cut perpendicularly to the axis of the glass fiber. The other end 112a of cladding 112 is finished to an aspherical lens surface by a known grinding process. In this manner, the optical wavelength converter device 110 shown in FIGS. 15 and 16 is produced. The configuration of the cladding end 112a will be described later.

The optical wavelength converter device 110 is used as shown in FIG. 16 as the optical wavelength converter device 10 is used according to the first embodiment.

The second harmonic 15' is emitted out of the device 110 from the cladding end 112a. The fundamental wave 15 which has been guided through the core 111 is emitted from the end 111a of the core 111. A light beam 15" containing the second harmonic 15', and the fundamental wave 15 then goes through a filter 18 which passes only the second harmonic 15'. Thereby, only the second harmonic 15' is extracted by the filter 18. The second harmonic 15' is converged into a small spot P by the cladding end 112a having an aspherical lens surface.

The configuration of the cladding end 112a of the cladding 112 will hereinafter be described in detail. As shown in FIG. 17, the cladding 112 is thick enough for the second harmonic 15' radiated into the cladding 112 at a phase matching angle $\theta$ to be directly emitted out of the device 110 from the cladding end 112a without being totally reflected by the outer surface of the cladding 112. To achieve this, the cladding 112 is dimensioned to satisfy condition (1) above. With such dimensional limitations, the wavefront of the second harmonic 15' traveling through the cladding 112 is oriented as indicated by the arrows W in FIG. 17, in one plane which includes the core axis. Therefore, as a whole the wavefront is of a conical shape. If the cladding end 112a is shaped as an aspherical lens surface, which is a combination of the conical surface J indicated by the broken line and a spherical surface K indicated by the dot-and-dash line, then the second harmonic 15' emitted out of the cladding 112 has a convergent spherical wavefront. The configuration of the cladding end 112a will be represented in the y-z coordinate system shown in FIG. 17. Since the optical wavelength converter device 110 is an optical system, which is symmetric with respect to its axis, it is sufficient to consider the cladding end 112a in the y-z coordinate system or the y-z plane. (Spherical or other aberrations are not taken into account in this or the following embodiments.) The configuration of the conical surface J is expressed by:

$$z_1 = a|y|$$

and the configuration of the spherical surface K is expressed by:

$$z_2 = r - \sqrt{r^2 - y^2} .$$

Therefore, the configuration of the cladding end 112a is represented by:

$$z(y) = z_1 + z_2 \qquad (2)$$
$$= a|y| + r - \sqrt{r^2 - y^2}$$

$$\text{where } a = \frac{n_C \sin\theta}{n_C \cos\theta - n_A}$$

$n_C$: the refractive index of the cladding,
$\theta$: the phase matching angle, and
$n_A$: the refractive index of the medium around the device (it is 1 if the medium is air)

By defining the configuration of the cladding end 112a according to the equation (2) above, the wavefront of the emitted second harmonic 15' becomes a convergent spherical wavefront, so that the second harmonic 15' can be focused into a small beam spot P.

Figure 18:
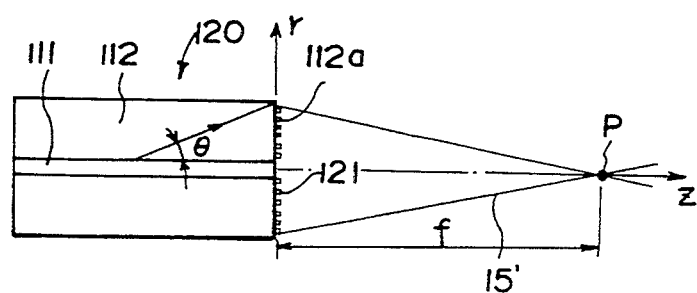
FIG. 18 is a sectional side elevational view and FIG. 19 is a front elevational view of an optical wavelength converter device according to the twelfth embodiment of the present invention.
Figure 19:
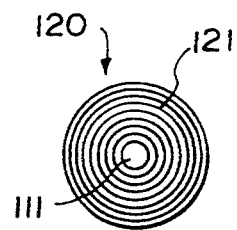

According to the twelfth embodiment of the present invention shown in FIGS. 18 and 19, an optical wavelength converter device 120 which includes a cladding 112 having an end 112a for emitting the second harmonic 15', the cladding end 112a having a plane surface extending perpendicularly to the core axis, and a grating 121 of concentric patterns disposed on the surface of the cladding end 112a. The grating 121 may be formed by the photolithographic process. The diameter D of the cladding 112 is thick, ranging from 1 mm to 3 mm, for example, so that condition (1) given above can be satisfied. Therefore, the grating 121 can be formed on the cladding end 112a relatively easily. The radius rm of the mth circular pattern or line of the grating 121 will be described below.

It is assumed, as shown in FIG. 18, that the position along the optical axis is represented by z, the position along the radial direction of the grating 121 by r, the refractive index of the cladding 112, the phase matching angle of the second harmonic 15' by $\theta$, and the focal length by f. Since the optical wavelength converter device 120 is symmetric with respect to the axis thereof, only one sectional plane across the device 120 will be considered. The phase $\Phi$ of the grating 121 is given by:

$$\Phi = \Phi_{OUT} - \Phi_{IN} = 2\pi m + \text{constant}$$

where $\Phi_{IN}$ is the phase of an incident wave having a conical wavefront, $\Phi_{OUT}$ is the phase of an emitted wave having a spherical wavefront, and m is an integer. Since $$\Phi_{IN} = (rn_C\sin\theta + zn_C\cos\theta)2\pi/\lambda$$

-continued
$$\Phi_{OUT} = \{-\sqrt{r^2 + (z-f)^2}\}2\pi/\lambda$$

and also z=0 on the grating surface, we get:

$$\Phi = (-\sqrt{r^2 + f^2} - r_C \sin\theta)2\pi/\lambda = 2\pi m + \text{constant}.$$

If $r = 0$ when $m = 0$ as a standard condition, then $$\text{constant} = -f \cdot 2\pi/\lambda$$

Consequently, the solution rm produced by solving the following quadratic equation:

$$(1 - n_C^2 \sin^2\theta)r^2 - 2n_C \sin\theta(m\lambda - f)r + (2f - m\lambda)m\lambda = 0$$

for the integer m is the radius of the mth circular pattern of the grating 112a.

The grating 121 may be used to converge the second harmonic 15' onto the reflecting surface of an optical disc, for example. In such an application, the radii of the circular patterns of the grating 121 should be determined also in view of the refraction of the second harmonic 15' within the optical disc.

By having the second harmonic 15' pass through the grating 121, the conical wavefront of the second harmonic 15' can be converted into a convergent spherical wavefront. Thus, the second harmonic 15' can be converged into a small beam spot P.

Figure 20:
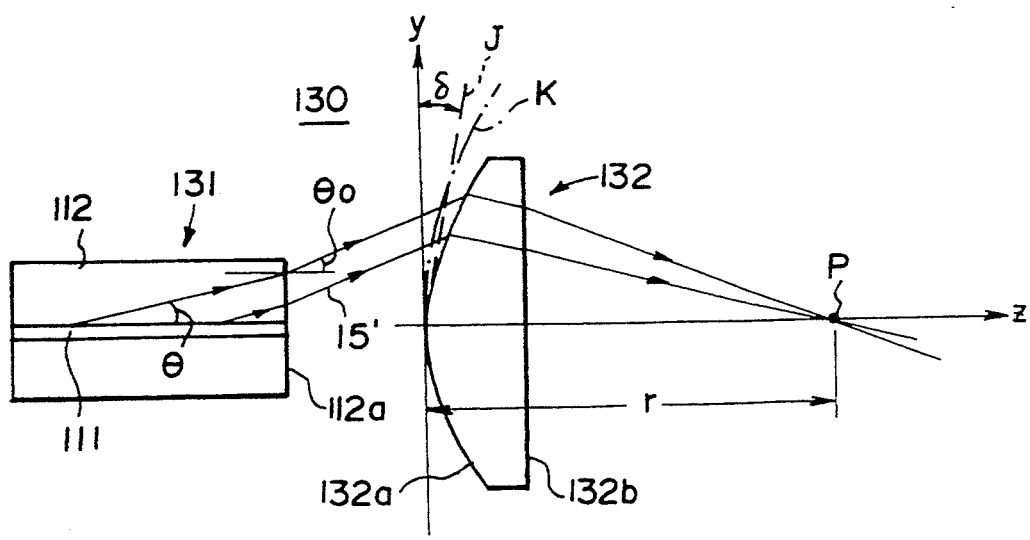

FIG. 20 shows an optical wavelength converter module 130 according to the thirteenth embodiment of the present invention. The optical wavelength converter module 130 comprises a fiber Cherenkov type optical wavelength converter device 131, identical to the previously described optical wavelength converter device, and a lens 132 disposed in confronting relation to the exit 112a of a cladding 112 of the optical wavelength converter device 131. The lens 132 has an aspherical surface 132a, facing the optical wavelength converter device 131, and a plane surface 132b, remote from the device 131. By defining the lens surface 132 according to the following equation:

$$z(y) = z_1 + z_2 \qquad (2)$$
$$= a|y| + r - \sqrt{r^2 - y^2}$$

where $a = \tan\delta = \dfrac{n_C \sin\theta_0}{n_L - \cos\theta_0}$ \qquad (3)

$\theta_0$: the angle at which the second harmonic 15' is emitted from the optical wavelength converter device 131, $\delta$: the angle at which the conical surface j is inclined, and $n_L$: the refractive index of the material of the lens 131, the second harmonic 15' that has passed through the lens 132 has a convergent spherical wavefront. Therefore, by defining the configuration of the lens surface 132a according to the equations (3) and (4) above, the wavefront of the second harmonic 15' that has passed through the lens 132 becomes a convergent spherical wavefront. Therefore, the second harmonic 15' can be focused into a small beam spot P, as with the eleventh and twelfth embodiments.

It is possible to design a lens having fewer aberrations by defining its aspherical configuration with coefficients of higher order than those of the above lens configuration.

If a lens having one plane surface is used as in this embodiment, the plane lens surface may be positioned closely against the cladding end 112a.

Figure 21:
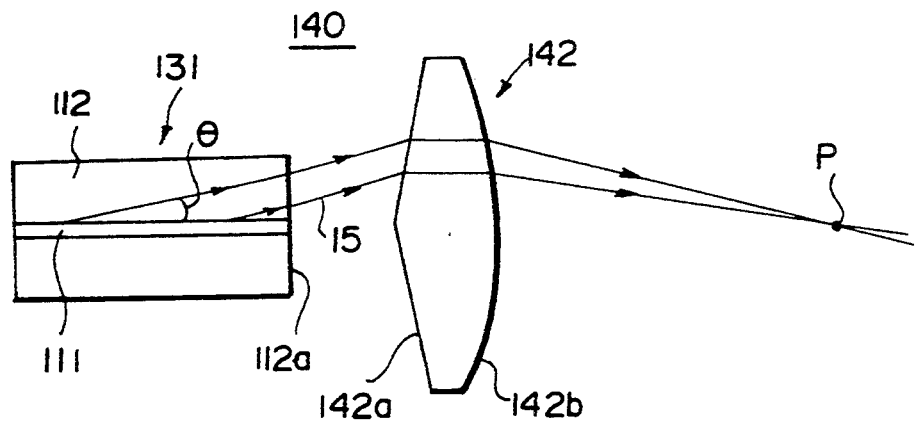

An optical wavelength converter module 140 according to the fourteenth embodiment shown in FIG. 21 comprises an optical wavelength converter device 131 and a lens 142. The lens 142 has a conical surface 142a, which faces the optical wavelength converter device 131, and an opposite spherical surface 142b. When the second harmonic 15' emitted from the optical wavelength converter device 131 passes through the conical lens surface 142a of the lens 142, the conical wavefront of the second harmonic 15' is converted into a plane wavefront. When the second harmonic 15' then passes through the spherical lens surface 142b, the plane wavefront thereof is converted into a convergent spherical wavefront, so that the second harmonic 15' can be converged into a small beam spot P.

A combination of a lens having a conical surface identical to the lens surface 142a above and an opposite plane surface, and another lens having at least one spherical surface may be employed in place of the lens 142; and it can achieve the same function as the lens 142.

An optical wavelength converter module 150 according to the fifteenth embodiment of the present invention will hereinafter be described with reference to FIG. 22. The optical wavelength converter device 150 comprises a fiber Cherenkov type optical wavelength converter device 131, and a grating device 151 disposed in confronting relation to the exit end 112a of the cladding 112 of the device 31. The grating device 151 comprises a grating 153, composed of concentric patterns, which is disposed on one surface of a transparent member 152, which is remote from the optical wavelength converter device 131. The wavefront of the second harmonic 15' emitted from the cladding end 112a, can be converted into a convergent spherical wavefront by passing through the grating device 151.

The configuration of the grating 153 will hereinafter be described in detail. It is assumed, as shown in FIG. 23, that the position along the optical axis is represented by z, the position along the radial direction of the grating 153 by r, the angle at which the second harmonic 15' is emitted from the cladding 112 by $\theta°$, and the focal length by f. The phase $\Phi$ of the grating 153 is given by:

$$\Phi = \Phi_{OUT} \Phi_{IN} = 2\pi m + \text{constant}$$

where $\Phi_{IN}$ is the phase of an incident wave having a conical wavefront, $\Phi_{OUT}$ is the phase of an emitted wave having a spherical wavefront, and m is an integer. Since $$\Phi_{IN} = (r\sin\theta_0 + z\cos\theta_0)2\pi/\lambda$$

$$\Phi_{OUT} = \{-\sqrt{r^2 + (z-f)^2}\}2\pi/\lambda$$

and also z=0 on the grating surface, we get $$\Phi = (-\sqrt{r^2 + f^2} - r\sin\theta_0)2\pi/\lambda = 2\pi m + \text{constant}.$$

-continued

If $r = 0$ when $m = 0$ as a standard condition, then
constant $= -f \cdot 2\pi/\lambda$ Consequently, the solution rm produced by solving the following quadratic equation:

$$(\cos^2 \theta_0)r^2 + 2 \sin \theta_0 (f - m\lambda)r + (2f - m\lambda)m\lambda = 0$$

for the integer m is the radius of the mth circular pattern of the grating 153.

Figure 24:
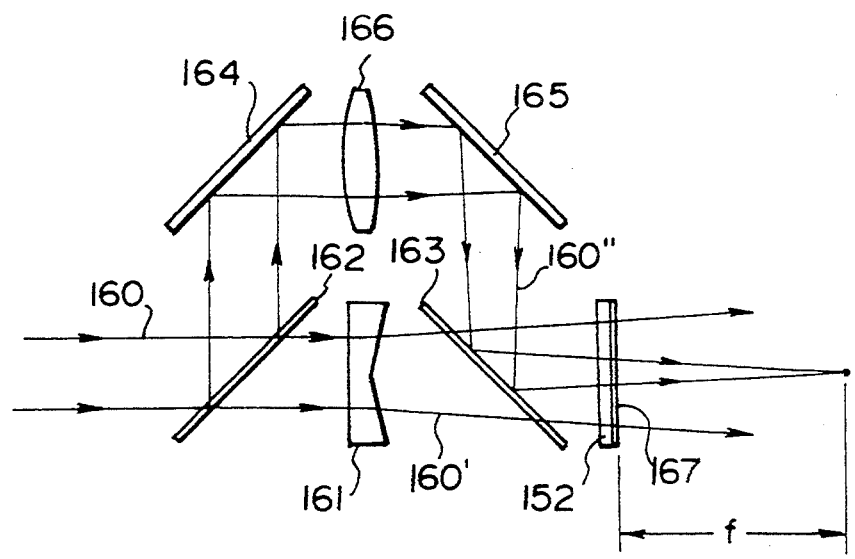
FIG. 24 shows the manner in which the optical wavelength converter module is produced.

The grating 153 can be fabricated by an electron beam lithographic process or a laser beam direct-writing process, or can be fabricated as a hologram using the system shown in FIG. 24. The system of FIG. 24 includes a lens 161, which has a concave conical surface for converting the plane wave 160 into the divergent wave 160', which has a conical wavefront similar to the second harmonic 15'; semireflecting mirrors 162, 163; fully reflecting mirrors 164, 165; and a spherical lens 166, for converting the plane wave 160 into the convergent wave 160'', which has a spherical wavefront. The grating 153 is formed by applying the divergent wave 160' and the convergent wave 160'' coaxially to a photosensitive layer 160 on the transparent member 152.

Figure 25:
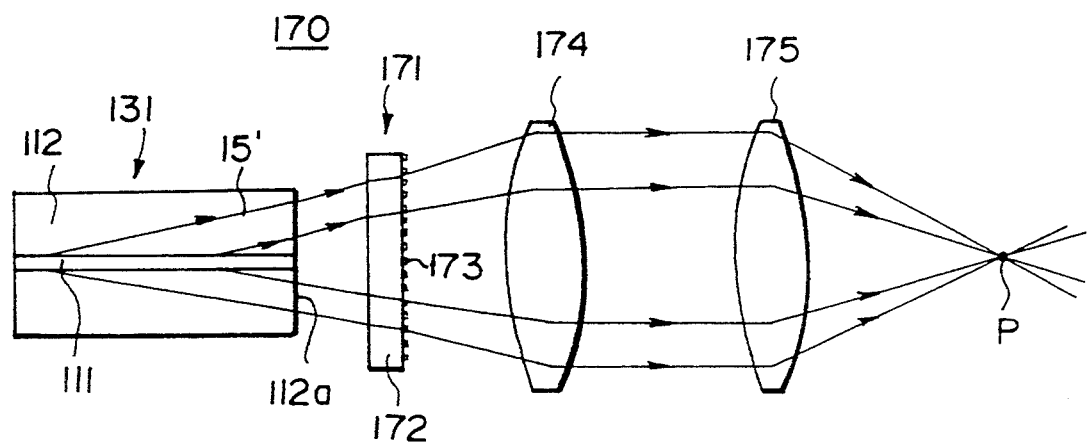
FIG. 25 is a sectional side elevational view of an optical wavelength converter module in accordance with the sixteenth embodiment of the present invention.

FIG. 25 illustrates an optical wavelength converter module 170 according to the sixteenth embodiment of the present invention. The optical wavelength converter module 170 comprises an optical wavelength converter device 131 and a grating device 171, which has a grating 173 composed of concentric patterns. The grating 173 is formed on a surface of the transparent member 172 and converts the conical wavefront of the second harmonic 15' into a divergent spherical wavefront. The second harmonic 15', with its wavefront thus converted, is then converted into a parallel beam of an increased beam width by the collimator lens 174 which comprises a spherical lens. The parallel-beam second harmonic 15' is then focused into a small beam spot P by the condenser lens 175 which is in the form of a spherical lens.

While the grating devices 151, 171 in the fifteenth and sixteenth embodiments are spaced from the respective optical wavelength converter devices 131, they may be held intimately against the cladding ends 112a of the devices 131.

The grating devices 151, 171 may be oriented such that the surfaces thereof, which support the gratings 153, 173, face the optical wavelength converter devices 131.

Each of the optical wavelength converter devices described above is designed to convert a fundamental wave into a second harmonic. However, the present invention is also applicable to an optical wavelength converter device which converts a fundamental wave into a third harmonic, or to an optical wavelength converter device which converts two fundamental waves into a wave having a frequency which is the sum of or difference between the frequencies of the fundamental waves.

In the present invention, since the wavefront of a wavelength-converted wave emitted from a fiber type optical wavelength converter device can be converted into a plane wavefront, the wavelength-converted wave can be focused into a small spot by passing through an ordinary spherical lens, as described above.

Furthermore, inasmuch as the wavefront of a wavelength-converted wave emitted from a fiber type optical wavelength converter device can be converted into a spherical wavefront, the wavelength-converted wave can be focused into a small spot by being passed through a collimator lens and a condenser lens, each in the form of an ordinary spherical lens.

According to the present invention, therefore, wavelength-converted waves can be utilized in optical recording apparatus in which a light beam is to be focused into a small beam spot. The technology of wavelength conversion thus finds a wider range of applications than previous.

Although certain preferred embodiments have been shown and described, it should be understood that many changes and modifications may be made therein without departing from the scope of the appended claims.

I claim:

1. An optical wavelength converter device comprising an optical fiber having proximal and distal ends including:
   i) a cladding having a first refractive index;
   ii) a core of a nonlinear optical material disposed in said cladding and having a second refractive index higher than said first refractive index, whereby said optical fiber converts the wavelength of a fundamental wave introduced into said core at said proximal end and radiates a wavelength-converted wave into said cladding;
   iii) said cladding emits the wavelength-converted wave at said distal end; and
   iv) a grating disposed in a position to receive the wavelength-converted wave emitted from said distal end for converting the wavefront of said wavelength-converted wave into a spherical wavefront.

2. An optical wavelength converter device comprising an optical fiber including:
   i) a cladding having a first refractive index;
   ii) a core of a nonlinear optical material disposed in said cladding and having a second refractive index higher than said first refractive index, whereby said optical fiber converts the wavelength of a fundamental wave introduced into said core and radiates a wavelength-converted wave into said cladding;
   iii) said cladding having an exit end for emitting the wavelength-converted wave; and
   iv) a grating disposed on said exit end and composed of equally spaced concentric patterns for converting the conical wavefront of said wavelength-converted wave into a plane wavefront.

3. An optical wavelength converter module for compensating for conical wavefront production in an optical fiber wavelength converter device and for radiating a wavelength-converter wave of coherent light having a planar wavefront, said module comprising:
   i) an optical wavelength converter device including an optical fiber comprising:
      a) a cladding having a first refractive index;
      b) a core of a nonlinear optical material disposed in said cladding and having a second refractive index higher than said first refractive index, whereby said optical fiber converts the wavelength of a fundamental wave introduced into said core and radiates and produces a wavelength-converted wave having a conical wavefront in said cladding; and c) said cladding having an exit end for emitting the wavelength-converted wave; and ii) an optical device disposed in a position to receive the wavelength-converted wave emitted from said exit end of the cladding of said optical wavelength converter device, for converting the conical wavefront of the received wavelength-converted wave into a plane wavefront.

4. An optical wavelength converter module according to claim 3, wherein said optical device is a lens the light entrance and/or light exit surface of which is conical.

5. An optical wavelength converter module according to claim 4, wherein said optical device comprises a lens having a conical entrance surface facing said exit end of said cladding.

6. An optical wavelength converter module according to claim 4, wherein said optical device comprises a lens having a conical exit surface facing away from said exit end of said cladding.

7. An optical wavelength converter module according to claim 6, wherein said lens has a plane entrance surface held against said exit end of said cladding.

8. An optical wavelength converter module according to claim 5 or 6, wherein said lens is spaced from said exit end of said cladding.

9. An optical wavelength converter module comprising:
  i) an optical wavelength converter device including an optical fiber comprising:
    a) a cladding having a first refractive index;
    b) a core of a nonlinear material disposed in said cladding and having a second refractive index higher than said first refractive index, whereby said optical fiber converts the wavelength of a fundamental wave introduced into said core and radiates a wavelength-converted wave into said cladding; and
    c) said cladding having an exit end for emitting the wavelength-converted wave; and
  ii) an optical device disposed in a position to receive the wavelength-converted wave emitted from said exit end of the cladding of said optical wavelength converter device, for converting the conical wavefront of the received wavelength-converted wave into a plane wavefront, wherein said optical device is a lens the light entrance and/or light exit surface of which is conical, and wherein said optical device comprises a lens having a conical entrance surface facing said exit end of said cladding and a conical exit surface facing away from said exit end of said cladding.

10. An optical wavelength converter module according to claim 9, wherein said lens is spaced from said exit end of said cladding.

11. An optical wavelength converter module for compensating for conical wavefront production in an optical fiber wavelength converter device and for radiating a wavelength converted wave of coherent light having a planar wavefront, said module comprising:
  i) an optical wavelength converter device including an optical fiber comprising:
    a) a cladding having a first refractive index;
    b) a core of a nonlinear optical material disposed in said cladding and having a second refractive index higher than said first refractive index, whereby said optical fiber converts the wavelength of a fundamental wave introduced into said core and radiates a wavelength-converted wave into said cladding; and
    c) said cladding having an exit end for emitting the wavelength-converted wave; and
  ii) an optical device disposed in a position to receive the wavelength converted wave emitted from said exit end of the cladding of said optical wavelength converter device, for converting the conical wavefront of the received wavelength-converted wave into a planar wave front, wherein said optical device is a lens the light entrance and/or light exit surface of which is conical, and wherein said optical device comprises a lens having a concave conical entrance surface facing said exit end of said cladding and a convex conical exit surface facing away from said exit end of said cladding.

12. An optical wavelength converter module according to claim 11, wherein said lens is spaced from said exit end of said cladding.

13. An optical wavelength converter module comprising:
  i) an optical wavelength converter device including an optical fiber comprising:
    a) a cladding having a first refractive index;
    b) a core of a nonlinear optical material disposed in said cladding and having a second refractive index higher than said first refractive index, whereby said optical fiber converts the wavelength of a fundamental wave introduced into said core and radiates a wavelength-converted wave into said cladding; and
    c) said cladding having an exit end for emitting the wavelength-converted wave; and
  ii) an optical device disposed in a position to receive the wavelength-converted wave emitted from said exit end of the cladding of said optical wavelength converter device, for converting the conical wavefront of the received wavelength-converter wave into a plane wavefront, and wherein said optical device comprises a graded-index lens.

14. An optical wavelength converter module for compensating for conical wavefront production in an optical fiber wavelength converter device and for radiating a wavelength converted wave of coherent light having a planar wavefront, said module comprising:
  i) an optical wavelength converter device including an optical fiber comprising:
    a) a cladding having a first refractive index;
    b) a core of a nonlinear optical material disposed in said cladding and having a second refractive index higher than said first refracting index, whereby said optical fiber converts the wavelength of a fundamental wave introduced into said core and radiates a wavelength-converted wave into said cladding; and
    c) said cladding having an exit end for emitting the wavelength-converted wave; and
  ii) an optical device disposed in a position to receive the wavelength-converted wave emitted from said exit end of the cladding of said optical wavelength converter device, for converting the conical wavefront of the received wavelength-converted wave into a planar wave front, and wherein said optical device comprises a grating device having a grating composed of equally spaced concentric patterns.

15. An optical wavelength converter module according to claim 14, wherein said grating device includes a transparent member supporting said grating on one surface thereof which faces away from said exit end of said cladding.

16. An optical wavelength converter module according to claim 15, wherein said grating device is spaced from said exit end of said cladding.

17. An optical wavelength converter module according to claim 15, wherein said grating device is held against said exit end of said cladding.

18. An optical wavelength converter device comprising an optical fiber including:
   i) a cladding having a first refractive index;
   ii) a core of a nonlinear optical material disposed in said cladding and having a second refractive index higher than said first refractive index, whereby said optical fiber converts the wavelength of a fundamental wave introduced into said core and radiates a wavelength-converted wave into said cladding; and
   iii) said cladding having an exit end for emitting the wavelength-converted wave, said exit end having an aspherical lens surface for converting the conical wavefront of said wavelength-converted wave into a spherical wavefront.

19. An optical wavelength converter device comprising an optical fiber including:
   i) a cladding having a first refractive index;
   ii) a core of a nonlinear optical material disposed in said cladding and having a second refractive index higher than said first refractive index, whereby said optical fiber converts the wavelength of a fundamental wave introduced into said core and radiates a wavelength-converted wave into said cladding;
   iii) said cladding having an exit end for emitting the wavelength-converted wave; and
   iv) a grating disposed on said exit end and composed of concentric patterns for converting the conical wavefront of said wavelength-converted wave into a spherical wavefront.

20. An optical wavelength converter module comprising:
   i) an optical wavelength converter device including an optical fiber comprising
      a) a cladding having a first refractive index;
      b) a core of a nonlinear optical material disposed in said cladding and having a second refractive index higher than said first refractive index, whereby said optical fiber converts the wavelength of a fundamental wave introduced into said core and radiates a wavelength-converted wave into said cladding; and
      c) said cladding having an exit end for emitting the wavelength-converted wave; and
   ii) an optical device disposed in a position to receive the wavelength-converted wave emitted from said exit end of the cladding of said optical wavelength converter device, for converting the conical wavefront of the received wavelength-converted wave into a spherical wavefront.

21. An optical wavelength converter module according to claim 20, wherein said optical device comprises a lens having an aspherical entrance surface facing said exit end of said cladding and a plane exit surface facing away from said exit end of said cladding.

22. An optical wavelength converter module according to claim 20, wherein said optical device comprises a lens having a conical entrance surface facing said exit end of said cladding and a spherical exit surface facing away from said exit end of said cladding.

23. An optical wavelength converter module according to claim 21 or 22, wherein said lens is spaced from said exit end of said cladding.

24. An optical wavelength converter module according to claim 20, wherein said optical device comprises a grating device having a grating composed of concentric patterns.

25. An optical wavelength converter module according to claim 24, wherein said grating device includes a transparent member supporting said grating on one surface thereof which faces away from said exit end of said cladding.

26. An optical wavelength converter module according to claim 25, wherein said grating device is spaced from said exit end of said cladding.

27. An optical wavelength converter module according to claim 25, wherein said grating device is fabricated as a hologram.

28. An optical wavelength converter module according to claim 24, wherein said optical device further includes a collimator lens positioned on one side of said grating device remote from said exit end of said cladding, and a condenser lens positioned on one side of said collimator lens remote from said grating device.

* * * * *